(12) United States Patent
Villarreal

(10) Patent No.: US 10,963,534 B2
(45) Date of Patent: Mar. 30, 2021

(54) SYSTEMS, METHODS, AND COMPUTER PROGRAM PRODUCTS FOR PROVIDING BACKUP DATA TO AN APPLICATION IN RESPONSE TO SERVICE FAILURE

(71) Applicant: PAYPAL, INC., San Jose, CA (US)

(72) Inventor: Herald Christophior Villarreal, Austin, TX (US)

(73) Assignee: PayPal, Inc., San Jose, CA (US)

( * ) Notice: Subject to any disclaimer, the term of this patent is extended or adjusted under 35 U.S.C. 154(b) by 136 days.

(21) Appl. No.: 16/209,085

(22) Filed: Dec. 4, 2018

(65) Prior Publication Data

US 2020/0175089 A1   Jun. 4, 2020

(51) Int. Cl.
| | | |
|---|---|---|
| H04L 29/08 | (2006.01) |
| G06F 16/957 | (2019.01) |
| H04L 29/14 | (2006.01) |
| G06F 16/958 | (2019.01) |

(52) U.S. Cl.
CPC ........ *G06F 16/9577* (2019.01); *G06F 16/958* (2019.01); *H04L 67/32* (2013.01); *H04L 69/40* (2013.01)

(58) Field of Classification Search
CPC ..... H04L 67/32; H04L 69/40; G06F 16/9577; G06F 16/958
See application file for complete search history.

(56) References Cited

U.S. PATENT DOCUMENTS

| | | | |
|---|---|---|---|
| 2007/0143496 A1* | 6/2007 | Golovinsky | G06F 16/958 709/238 |
| 2011/0161800 A1* | 6/2011 | Tierney | G06F 16/00 715/234 |
| 2013/0031060 A1* | 1/2013 | Lowery | G06F 16/9574 707/689 |
| 2015/0180733 A1* | 6/2015 | Krutzler | H04L 67/04 709/219 |

\* cited by examiner

*Primary Examiner* — Jason D Recek
(74) *Attorney, Agent, or Firm* — Haynes and Boone LLP

(57) ABSTRACT

A system, includes a non-transitory memory; and one or more hardware processors coupled to the non-transitory memory and configured to read instructions from the non-transitory memory to cause the system to perform operations comprising: transmitting a message from an application client to a service to request content from the service; ascertaining a failure of the service to provide the requested content; and in response to ascertaining the failure, applying data from the application client to an application in lieu of the requested content.

20 Claims, 8 Drawing Sheets

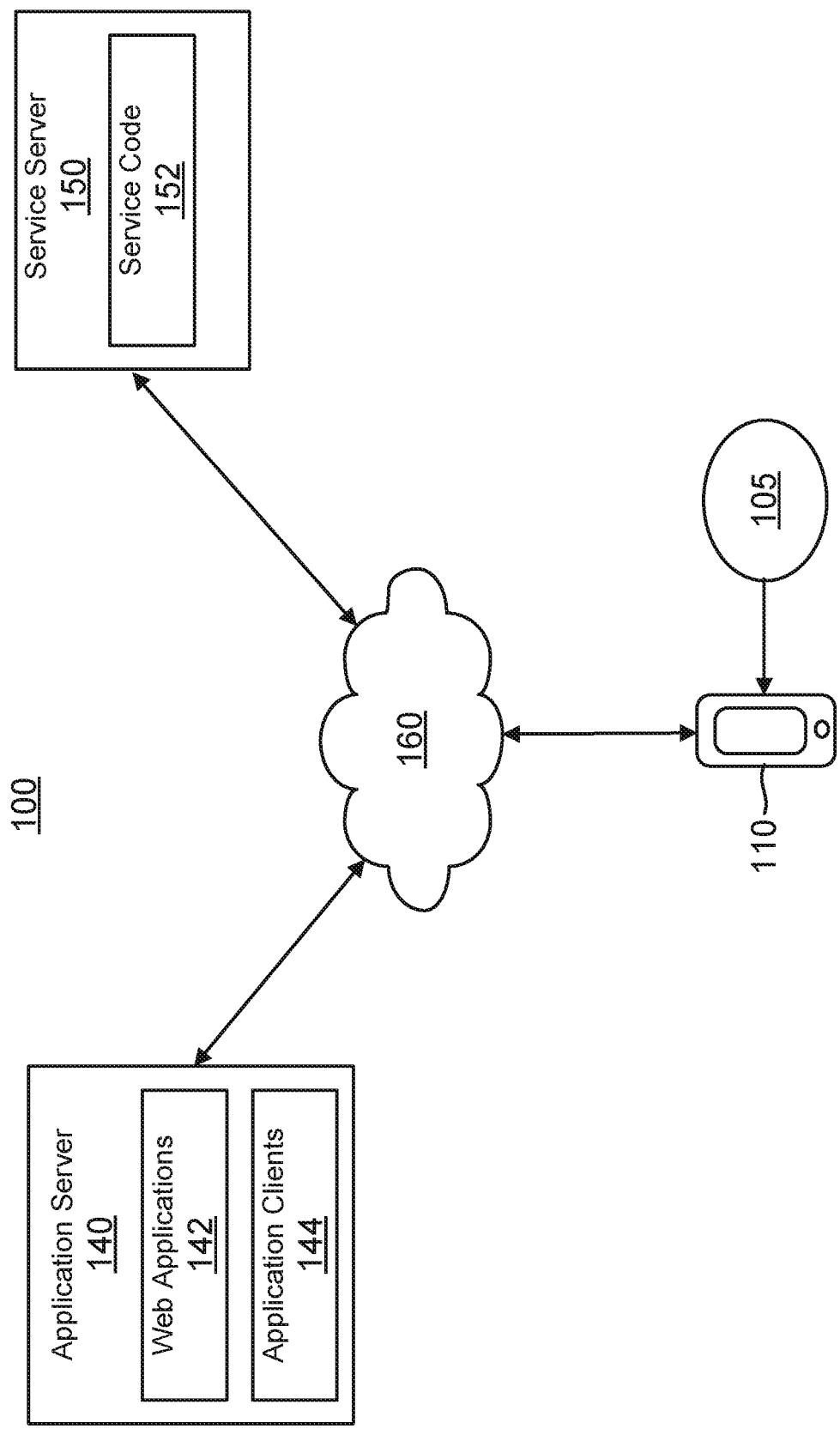

SYSTEMS, METHODS, AND COMPUTER PROGRAM PRODUCTS FOR PROVIDING BACKUP DATA TO AN APPLICATION IN RESPONSE TO SERVICE FAILURE

BACKGROUND

Field of the Invention

The present disclosure generally relates to internet applications and, more specifically, to techniques for providing backup data to an application in lieu of requested content in response to a service failure.

Related Art

As time goes on, online applications become more and more prevalent. An example of an online application may include an interactive webpage for a user to access an electronic account. The user accessing the application may have certain expectations, such as a level of service, quality of look and feel, and ability of the application to allow access to desired information.

Further, online applications have become increasingly sophisticated in order to make desired information available in response to user preferences. For instance, some online applications may include a variety of different user-selectable items and may share those user-selectable items with other applications. One example may include a website having a multitude of individual pages, where each of the pages is its own application, and those different pages may share selectable items (e.g., a search feature, a settings feature, and the like). The example may further include each of the different applications accessing a common service to receive those shared selectable items.

When the different applications share a common service, that may help to provide a common user experience in look and feel across the multitude of different applications. However, if the shared service is non-functional, then the user experience may suffer across the different applications sharing the service. Of course, the shared service may be repaired and go back online, but for the time that the service is down, users may notice the change in functionality and the change in look and feel. And when users notice a degradation in either functionality or quality of experience, it may lead to a change in user feelings about the application in general, even if the degradation is only temporary.

It would be desirable to have a technological solution that provides consistency of functionality and user experience across a variety of different applications even when a shared service experiences a failure or is otherwise non-functional.

BRIEF DESCRIPTION OF THE FIGURES

FIG. 1 is block diagram of a networked system suitable for use with applying content to an application according to an embodiment.

Figure 2A:
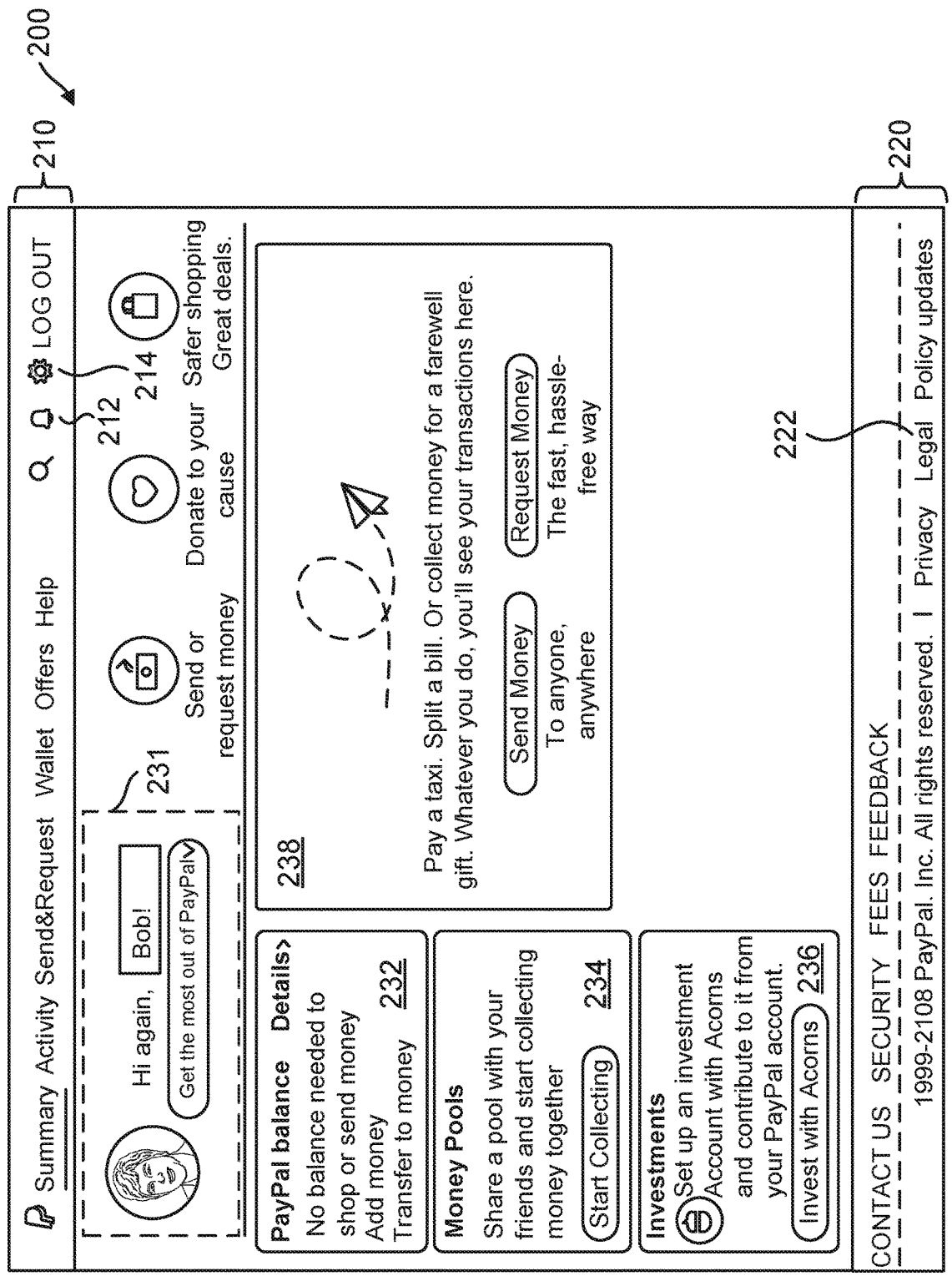
FIG. 2A is an illustration of an example application to which content may be applied, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Various embodiments provide for systems and methods that provide backup data to online applications in lieu of requested content from a service, e.g., in response to a failure of the service.

In one example, a user accesses an application. In one example embodiment, the application may include a webpage, which is one of a multitude of webpages constituting a website. The webpage itself may include code to render the contents of the webpage on a browser as well as code for an application client. In this example, the application client includes functionality to provide particular content to the webpage. Examples of content that may be the responsibility of an application client include headers, footers, advertisements, and the like.

Continuing with the example, when the user accesses the webpage, an application server executes the code constituting the application client and transmits the webpage (e.g., HTML, Javascript, and the like) to a browser at the user's computer. As it runs, the application client transmits a message to an online service to request content from the online service. When the online service is available, it then returns the requested content to the application server, and the application server transmits that content to the browser with the other content of the webpage. In an embodiment wherein the requested content includes a webpage header or footer, the application client causes the header and footer content to be sent to the browser as usual.

Further in this example, it may happen from time to time that the online service is unavailable. For instance, the application client may transmit the message to the service to request the content and either receive no response, receive an unexpected response, receive incorrect content, or some other outcome different from receiving the requested content. The application client may recognize the response from the service (or lack of response) as a failure and, in response to detecting the failure, take certain actions. In one example embodiment, the application client itself includes data constituting backup content that may be applied to the application in lieu of the requested content in the case of service failure.

Continuing with this example, once the application client has ascertained the failure of the service to provide the requested content, it may apply its data to the application by transmitting that data to the user's browser. In the embodiment in which the requested content includes a webpage header and footer, the content provided by the application client may also include a webpage header and footer that may appear the same as or similar to the header and footer that would have otherwise been provided by the service. However, in some embodiments the data stored by the application client may represent content that is less robust than the content that would have been provided by the service. In other words, various embodiments may include fallback data that is lightweight, when compared to data that would have otherwise been provided by the service, in order to keep the size of the application client code manageable.

Further continuing with the example, the user may move from webpage to webpage during a visit to the website. Assuming the service is still unavailable, each of the different webpages may include the same or similar application clients to provide the same or similar content in lieu of the content that would have been provided by the service. Once the service becomes available, and the user opens an application, the application client may successfully retrieve the requested content from the service and apply that content (instead of the backup content) to the application during the user's visit.

Various embodiments may include one or more advantages over other systems. For instance, the various embodiments described herein may provide a consistent user experience across the different applications, even when the service is unavailable. Specifically, the application clients may include data representing content that approximates what the user would expect when visiting the application, thereby being invisible or almost invisible to the user. This may be true even if a number of features in the backup content is less than a number of features in the content from the service. From the standpoint of the application provider (e.g., an owner of a website) the consistent user experience may translate to higher esteem from customers, as those customers are less likely to experience degraded performance or degraded look and feel over multiple visits, even if the service is unavailable. From the standpoint of the user, look and feel as well as functionality may be consistent, thereby providing a pleasing experience.

The scope of embodiments is not limited to webpages. Rather, the techniques described herein may be applied to any interactive application that uses an online service to retrieve content. For instance, some applications may not be browser-based or web-based and may run on any of a number of devices, such as laptop computers, tablets, or smart phones. Furthermore, the content provided by the online service and the application client is not limited to webpage headers and footers, as any appropriate content may be provided by an application client. For instance, content appearing anywhere on a user interface of an application or any appropriate feature provided by the application may be applied by the application client in response to a failure of an online service according to the design of the application itself.

FIG. 1 is a block diagram of a networked system suitable for implementing applications and services according to an embodiment. Networked system 100 may comprise or implement a plurality of servers and/or software components that operate to perform provide online content. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a application server 140, and a service server 150 in communication over a network 160. Network 160 may be implemented as a single network or a combination of multiple networks. For example, in various embodiments, network 160 may include the Internet or one or more intranets, landline networks, wireless networks, and/or other appropriate types of networks.

User device 110, application server 140, and service server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented using any appropriate hardware and software configured for wired and/or wireless communication over network 160. For example, in one embodiment, the user device 110 may be implemented as a personal computer (PC), a smart watch, a smart phone, a smart phone with additional hardware such as NFC chips, BLE hardware etc., wearable devices with similar hardware configurations such as a gaming device, a virtual reality headset, that talk to a smart phone with unique hardware configurations and running appropriate software, laptop computer, and/or other types of computing devices capable of transmitting and/or receiving data, such as an iPad™ from Apple™.

User device 110 may employ a transceiver to communicate over network 160 with application server 140, and service server 150. User device 110 may communicate with application server 140 and service server 150 either via network 160 or via other means (e.g., directly by Bluetooth or NFC).

User device 110 may include a web browser or application which may be used, for example, to provide a convenient interface to permit a human user 105 to browse information available over network 160. For example, in one embodiment, user device 110 may include a web browser configured to view information available over the Internet, such as a user account for online shopping and/or merchant sites for viewing and purchasing goods and services. In this example, user device 110 may be used by human user 105 to access web applications 142 over network 160 and using either a web browser or other utility installed thereon.

User device 110 also may include other applications to perform functions, such as email, texting, voice and IM applications that allow user 105 to send and receive emails, calls, and texts through network 160, as well as applications that enable the user 105 to communicate, transfer information, and make payments.

Any of the servers 140, 150 may be implemented using any appropriate hardware and software. In one example, the servers 140, 150 may include one or more commodity servers running Linux or another operating system. Additionally, or alternatively, servers 140, 150 may include software servers running on any appropriate hardware, such as a laptop computer, a desktop computer, a server in a rack, a tablet computer, or the like. The various applications 142, 144, 152 may be implemented as programs running on operating systems at their various respective servers. It should also be noted that while the various servers 140, 150 are illustrated in this example as a single box, servers may be implemented by themselves or as groups of servers or as virtual servers.

Application server 140 may be maintained by any appropriate entity, and in one example, by an entity that provides a highly interactive and functional website. For example, application server 140 may be maintained by a service provider (e.g., PayPal Inc.), an online store, a streaming service, or the like. The various examples that follow are directed toward a scenario where application server 140 is associated with a website; however, it is understood that the concepts described herein apply equally well to any online application, whether web-based or otherwise.

Application server 140 includes web applications 142 and application clients 144. In one embodiment, human user 105 may interact with web applications 142 through a browser or other utility over network 160. For instance, the web applications 142 may include a website that is presented externally over network 160 to a browser or other application at device 110 using HTTP or other appropriate protocols, where each webpage of the website is an individual application. Human user 105 may access the web applications 142 to use the functionality thereof (e.g., accessing or updating account information, making a purchase, streaming music, making a donation, and the like).

Application clients 144 may in some embodiments include a plurality of different application clients, where each respective application client is associated with a particular web application. In other examples, application clients 144 may include a single application that is associated with one or a multitude of web applications, or application clients 144 may include multiple applications where there may or may not be a one-to-one relationship between application clients and web applications. In any event, application clients 144 include functionality to provide particular content to the web applications 142, either via service server 150 or from data stored to application clients 144, as described further below. For instance, when user 105 accesses one of the web applications 142, one of the application clients 144 may retrieve content from the service server 150 and then provide that content to user device 110. In other examples, if service server 150 fails to provide requested content, then one of the application clients 144 may provide backup data to user device 110 in lieu of the content that would otherwise be provided by service server 150.

Service server 150 may be associated with the same entity or a different entity that is associated with application server 140. Service server 150 includes service code 152, which is explained in more detail below with respect to FIG. 3. Service server 150 may execute service code 152 to provide content to application clients 144 in response to requests from application clients 144. This is explained in more detail with respect to FIGS. 5 and 6.

FIG. 2A is an illustration of an example application 200, according to one embodiment. In this example, the application 200 includes a webpage, which may be included in a larger website, but for ease of illustration only one such webpage is shown. The application 200 includes a variety of interactive features. At the top of application 200 is header 210, which includes a multitude of different selectable web elements, such as hyperlinks which may take the user to another application. For instance, in header 210, the option "Summary" is underlined, indicating that the particular application 200 is a summary page. Other selectable elements include Activity, Send & Request, Wallet, Offers, Help, Log Out, and graphic features including a settings feature 214 and bell feature 212, which allows a user to view and edit alerts.

Similarly, footer 220 includes a variety of selectable features as well including Contact Us, Security, Fees, Feedback, copyright information, Privacy, Policy Updates, and Legal 222. In this example, the footer 220 may include a plurality of selectable elements that are required by law or otherwise helpful but may not be of primary interest to a user. For instance, legal 222 may take user 105 to a page with disclaimers or other legal information The middle part of application 200, between header 210 and footer 220, represents the web content associated with the page itself, and while that web content may be rendered on a same user interface as header 210 and footer 220, it is separate from the header 210 and footer 220. In this example, the web content of the page itself includes a variety of different features, including a welcome section 231, a utility to check a balance 232, a utility for pooling money 234, a utility for checking investments 236, a sending and receiving money utility 238, and others. The content of the page, including features 231-238, are selectable web elements that may be clicked or otherwise selected by a user to provide functionality or information.

Going back to the example of FIG. 1, the header 210 and footer 220 may be provided by application client 144, either via service server 150 or from data stored to application client 144 itself. By contrast, the content of the page, including features 231-238, in this example are part of an application 142. The application server 140 would transmit the content of the page and any content from application client 144 over network 160 to user device 110 in response to a user accessing the application.

FIG. 2A illustrates what the user 105 may see during normal operation of service server 150. In other words, when service server 150 is not experiencing a failure, it would return content representing header 210 and footer 220 to an application client 144 to be rendered upon the display of user device 110 along with the content of an application 142. However, in some instances service server 150 may experience a failure or may not be available to application clients 144. In those example instances, an application client 144 may apply its own data to the application to approximate header 210 and footer 220. This is shown by FIG. 2B, including header 280 and footer 290.

Figure 2B:
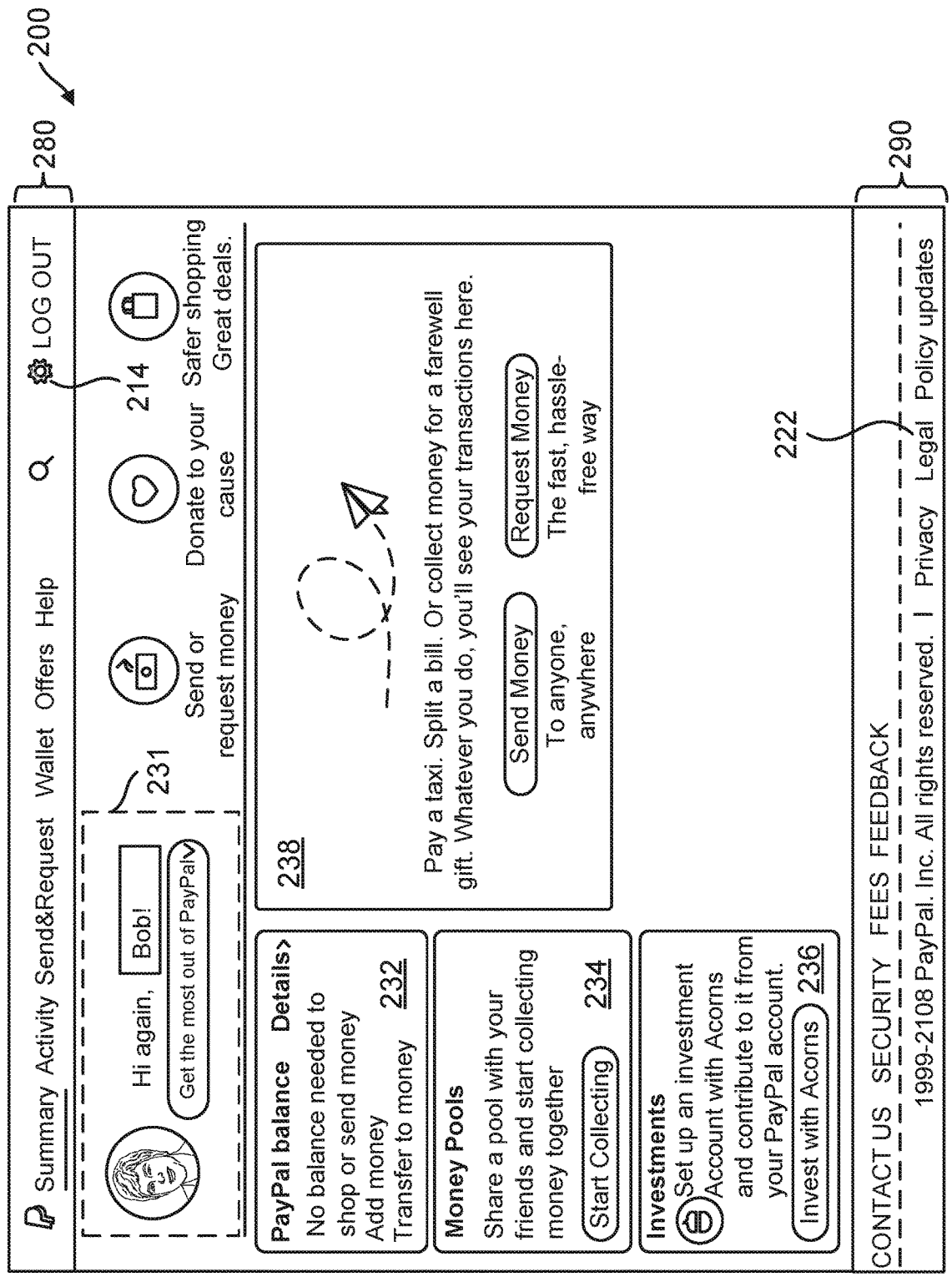
FIG. 2B is an illustration of an example application to which content may be applied in a scenario where the content is not successfully received from a service server, according to one embodiment

In the present example of FIG. 2B, footer 290 is the same as or substantially similar to footer 220 of FIG. 2A. Header 280 is different from header 210 in that it omits bell feature 212. Omitting bell feature 212 may permit an application client 144 to store less data than is associated with header 210, while retaining a same look and feel as header 210.

Of course, omitting bell feature 212 is just an example, as other features (e.g., legal 222) could be omitted as well. For instance, in a different embodiment, application client 144 may omit settings feature 214 rather than bell feature 212. Generally, omission of a feature allows the code for that feature to be omitted from the application client 144, and omissions of more features would generally be expected to make the code for the application client 144 smaller. Similarly, some features may be associated with more code than are other features. In one example, bell feature 212 may be associated with 2 MB of code, whereas settings feature 214 may be associated with 1 MB of code. Thus, a developer may choose to create application client 144 so that it omits bell feature 212, thereby saving 2 MB of code from being transmitted with the application client 144 whenever the application 200 is downloaded to device 110. Of course, that is a choice for the developer, and the developer could have chosen to omit settings feature 214 as well to save a total of 3 MB of code from being transmitted. Put another way, the developer may create the application client 144 to either omit or include any of the items in header and footer 210, 220 to achieve a particular code size for application client 144 while retaining a same or similar look and feel and functionality.

Furthermore, it should be noted that the example of FIGS. 2A, 2B is directed to application client 144 providing content for the headers and footers rather than for the body of the application 200. However, the scope of embodiments may include application client 144 providing any content for an application. For instance, a developer may design the application 200 and the application client 144 so that a piece of body content (e.g., item 232) is provided as a service by the application client 144. An additional example may include a banner advertisement that appears on the side of the body or above or below the body, which may be provided as a service by the application client 144.

Accordingly, an advantage of some embodiments is that an application client 144 may approximate a look and feel and functionality of an application, while also minimally affecting an efficiency of the system as a whole by storing less data than is associated with the content of the service server 150. For instance, a developer may tailor application client 144 to omit bell feature 212, thereby saving 2 MB from being transmitted over network 160 at each instance of a user accessing the web applications 142. This may reduce bandwidth use when compared to an application client that would otherwise include all of the features. Saving bandwidth use may reduce application loading time at the user device 110, use less data from a user's mobile data cap, and save bandwidth congestion at application server 140.

Of course, reducing size of the code of the application client 144 may be balanced against user expectations for look and feel and functionality. For instance, a developer may determine (e.g., through market research) that a user would prefer to have bell feature 212 rather than settings feature 214 if functionality was to be reduced. Accordingly, the developer may make a value judgment regarding the extra 1 MB of code size reduction versus user preference, and different developers may come to different conclusions.

In some examples, omission of a feature may not only be for the purpose of reducing size, but also about providing the backup the minimum necessary for the user to be able to accomplish what the user desires without causing a degraded experience. While some features may be convenient to have, a developer may decide that for a lightweight experience that feature may not be necessary, whereas other features may be more important. An example may be that a developer determines that some of the links in the header 210 (e.g., search) may be more important than others, since without this navigating the site becomes noticeably less convenient for the user. On the other hand, a developer may determine that the bell icon 212 may be something that is less necessary based on knowledge of how users use the application 200.

Figure 3:
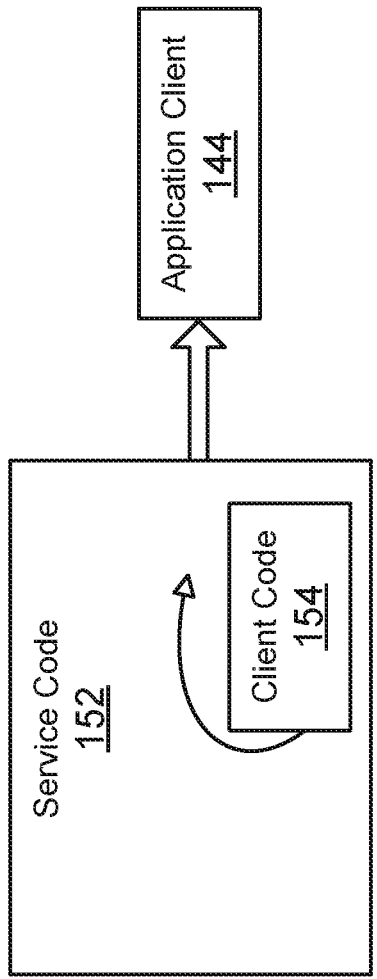
FIG. 3 is an illustration of an example process for generating an application client, according to one embodiment.

FIG. 3 is an illustration of an example process 300 for generating an application client 144, according to one embodiment. Process 300 may be performed by a developer at a local machine (e.g., a laptop or tablet communicating with network 160) or a remote machine. Service code 152 includes application content for one or a multitude of applications 142. For the purposes of this example, applications 142 may include features for a variety of different dynamic characteristics. An example dynamic characteristic includes a characteristic that may be different for different users, such as a language characteristic, a local legal requirement, disability accessibility, or the like. For instance, the application 200 of FIGS. 2A and 2B may be intended to be used for a variety of different languages, such as English, German, Spanish and the like. Accordingly, its corresponding application client 144 may detect which dynamic characteristic is applicable and then request appropriate content based on the dynamic characteristic so that, e.g., a German header and footer would be displayed for a user accessing the application from a German Internet Service Provider (ISP).

Service code 152 includes the content for each of the different dynamic characteristics so that it can provide the full header and full footer for any given user, as requested by application client 144. Furthermore, service code 152 includes client code 154. The developer's machine (or other machine) executes client code 154 to generate the code for application client 144. In this example, client code 154, as it is executed, programmatically gathers web content from the service code 152 for inclusion in the application client 144. Once application client 144 is generated, it may be published to the different applications 142 periodically, in response to application client 144 being updated, in response to a given application 142 being updated, or at any other appropriate time.

As noted with respect to FIGS. 2A and 2B, the data that is stored to an application client 144 may be less inclusive of web features than is the service code 152. Specifically, in the example of FIG. 2B, the bell feature 212 was omitted, whereas other features from header and footer 210, 220 were included in header and footer 280, 290. In this example, the client code 154, as it is executed, would omit the bell feature from the code constituting application client 144. In this example, the purpose of being less inclusive of web features is to reduce an amount of code that is included within the application client 144 so that a total size of the application client 144 may be manageable. A manageable size for application client 144 may be dependent upon a number of factors, including available bandwidth, expectations of users, network data available to users, and the like. In this example, those factors are within the purview of the developer. So if a developer is aware than a typical user has 5 GB of 4G data per month, the developer may choose to omit the bell feature 212 and the settings feature 214 to use less data, though the developer may be more inclusive of features in a later iteration (e.g., three years from now) as user data caps and network speeds increase.

Figure 4:
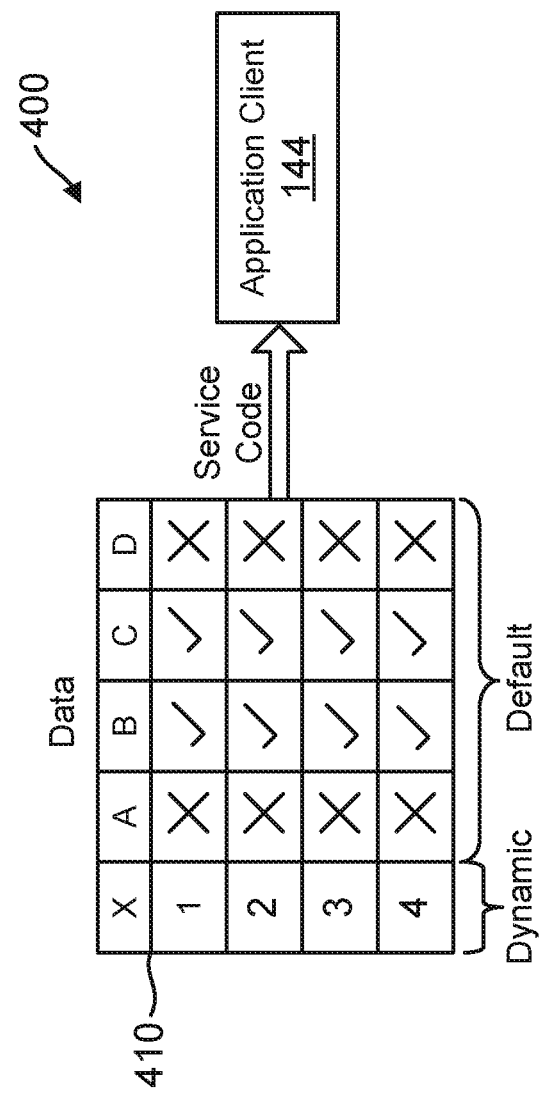
FIG. 4 is an illustration of an example logic for generating different data combinations which run through the service code and are stored in the application client, according to one embodiment.

FIG. 4 is an illustration of example logic 400, which may be included in client code 154, according to one embodiment. Features that are included or excluded are indicated by the data map 410. The data map 410 may be determined by developers (and perhaps stakeholders as well) to specify which of the different features should be included or omitted to result in a light-weight backup. The application client 144 may include the results of this determined state being run through the service code 152. Logic 400 in this example includes the data map 410, which is part of client code 154, and other code that accesses the data map 410, processes the data map 410 through service code 152 and receives the result of the processing.

Specifically, the example logic 400 may be used to generate application client 144 from the service code 152. The logic 400 is added by the developer to specify which of the features to include within application client 144 and which of the features to omit. As noted above, the developer may choose to include or omit features to balance a size of code of application client 144 with user expectations for look and feel and functionality. Furthermore, the example logic 400 may be executed by the developer's machine (or other machine) as it generates application client 144.

The leftmost column labeled X represents dynamic characteristics, such as language. As noted above, dynamic characteristics may include local legal requirements, disability accessibility, and the like, but for simplicity this example focuses on language. In other words, in this example it would be expected that the application itself may have a variety of states, each of the states corresponding to a particular dynamic characteristic, depending on where and how the application is accessed. For instance, a user in Germany may access the application through a German ISP, and application server 140 detects the German ISP in response to the request with German content. The application client 144 recognizes the state and, in response, serves German headers and footers.

Returning to the example, the client code 154 generates the application client 144 using the logic 400 to select code to be included within application client 144, that code being used to provide features for the headers and footers. In this example, 1 may be English, 2 may be German, 3 may be Spanish, and 4 may be Mandarin. The four rightmost columns represent application features. Taking for example, the top row (labeled 1), application features A and D would not be included in the application client 144, whereas application features B and C would be included in application client 144. The various inclusions or omissions may be the same or different across the dynamic characteristics—in this example they are the same, but other embodiments may be different. As noted above, the client code 154 uses the logic 400 to generate the application client 144 by including some features from the service code and omitting other features from the service code. In this example, the result is that the generated application client 144 includes some features for each of the dynamic characteristics and omits some features for each of the dynamic characteristics, and the included features are represented by code that is stored in the application client 144. An advantage of the embodiment of FIG. 4 is that it may allow the service server 150 to generate an efficient application client 144.

Some embodiments may include increased automation versus the examples described above. For instance, an embodiment may include functionality to ascertain the size of applicable portions of service code 152, compare that size to one or more suggested limits on sizes of application client 144, and then suggest features to omit so that resulting sizes are lower than the suggested limits. A developer may then choose to accept or reject some of those suggestions. In another embodiment, the system may automatically choose to omit some features so that a size of the resulting application client 144 is below a limit that is either set by developer or set by the system. In some embodiments, a developer may input information to the system to rank features in terms of which ones may be omitted first, and the system may use that information to omit features in the order of the ranking until a size of the resulting application client 144 is below a size limit.

Figure 5:
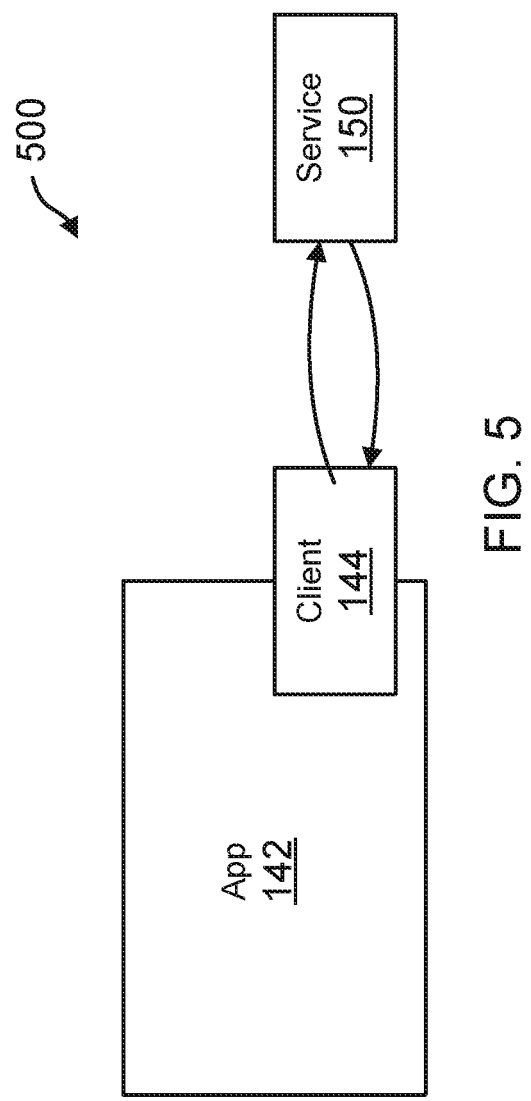
FIG. 5 is an illustration of an example process for requesting content for an application, according to one embodiment.

FIG. 5 illustrates an example process 500 to render an application 142 upon a user device 110, according to one embodiment. Process 500 illustrates actions by the application server 140 and the service server 150. In the example of FIG. 5, a particular application 142 is associated with a particular application client 144, where the application client 144 provides some of the content for the application 142 (e.g., headers and footers, advertisements). User 105 at user device 110 may access the application 142, and in response the application server 140 may execute application client 144, which communicates with the service server 150 to access the appropriate content for the application 142.

The application client 144 may or may not receive the requested content from the service server 150. Although not shown explicitly in FIG. 5, the communication between application client 144 and service server 150 may occur over network 160. Whether the application client 144 receives the requested content from the service server 150, or applies its own data to the application 142, the application server 140 transmits the content over the network 160 to the user device 110. This is explained in more detail with respect to FIG. 6.

Figure 6:
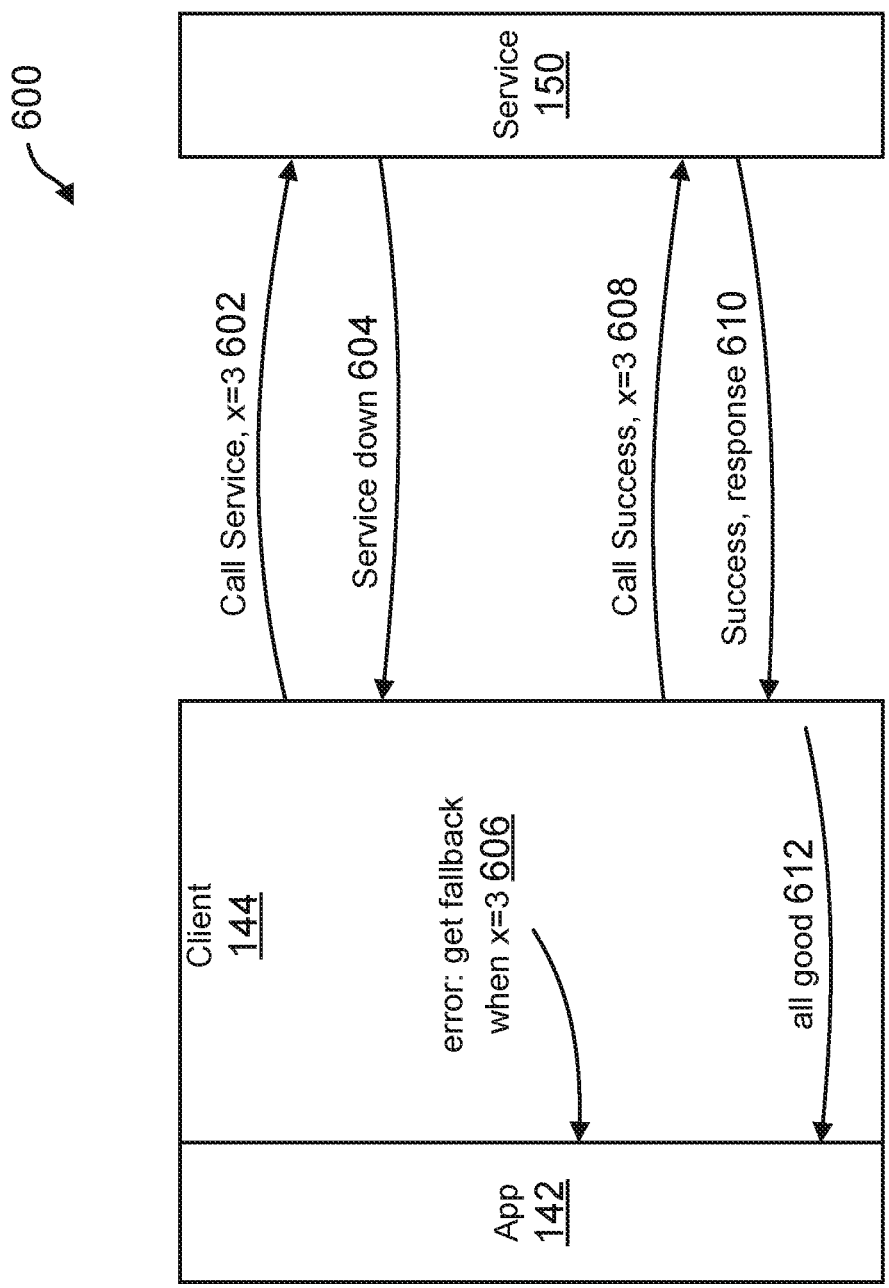
FIG. 6 is an illustration of an example process for requesting content for an application and applying content to an application, according to one embodiment.

FIG. 6 is an illustration of an example process 600 to render in application 142 upon a user device 110, according to one embodiment. Process 600 illustrates actions by the application server 140 and the service server 150.

Actions 602-606 illustrate a scenario wherein application client 144 detects a failure by service server 150. At action 602, the application client 144 calls the service server 150 for application content corresponding to a dynamic characteristic (X equals three). In this example, X equals three may indicate a dynamic characteristic, such as language or local legal requirement. In the example of FIG. 4, X equals three indicates Spanish.

At action 604, the application client 144 detects that service server 150 fails to return the requested content. For instance, failure may be detected either by the response including an error attribute or via standard http codes where the network connection was an issue. In some examples, the application client 144 may detect that the request at action 602 times out before there is a response. In another example, the application client 144 may receive an explicit error message from service server 150, may receive unexpected content, or may receive incorrect content. In any event, application client 144 does not get the requested content from service server 150, and the application client 144 correlates that failure with an error.

At action 606, the application client 144 provides its own data as a fallback in lieu of the requested content. Furthermore, application client 144 includes intelligence to determine which dynamic characteristic applies to the particular scenario, and it selects appropriate data from its own store of data according to the particular dynamic characteristic. For instance, if a user accesses the application via a German ISP, the application server 140 may return German content. The application client 144 recognizes the state of the application to be set to German, and it selects the content from its own data corresponding to that state. This scenario may also include the application client 144 transmitting its fallback data over network 160 to the client device 110. At the client device 110, the application 142 is rendered along with the application content from the application client 144, as in the example of FIG. 2B.

Actions 608-612 illustrates a scenario in which the application client 144 is successful in retrieving appropriate content from the service server 150. Action 608 is the same as or similar to action 602, described above.

At action 610, there is a successful response from the service server 150. In other words, in this example, service server 150 returns the requested content to the application client 144. Application client 144 may recognize that the error has been corrected by recognizing that the requested content has, indeed, been returned by the service server 150. In response, the application client 144 then transmits the retrieved content to the user device 110 via application 142. At the client device 110, the application 142 is rendered along with the application content from the service server 150, as in the example of FIG. 2A.

Application 142 is rendered by the user's browser for as long as the user stays on the webpage. If the user chooses to go to a different webpage or refreshes the browser, then the application client 144 may call the service, as in actions 602 and 608. Thus, if the service is unavailable at one point in time but becomes available before the next time the user goes to different webpage, when the user goes to the webpage the next time the user may receive the content from the service server 150. Similarly, if the service becomes unavailable as the user is browsing, the next time the user goes to a different webpage or refreshes the browser, the user may receive the content stored to the application client 144.

Figure 7:
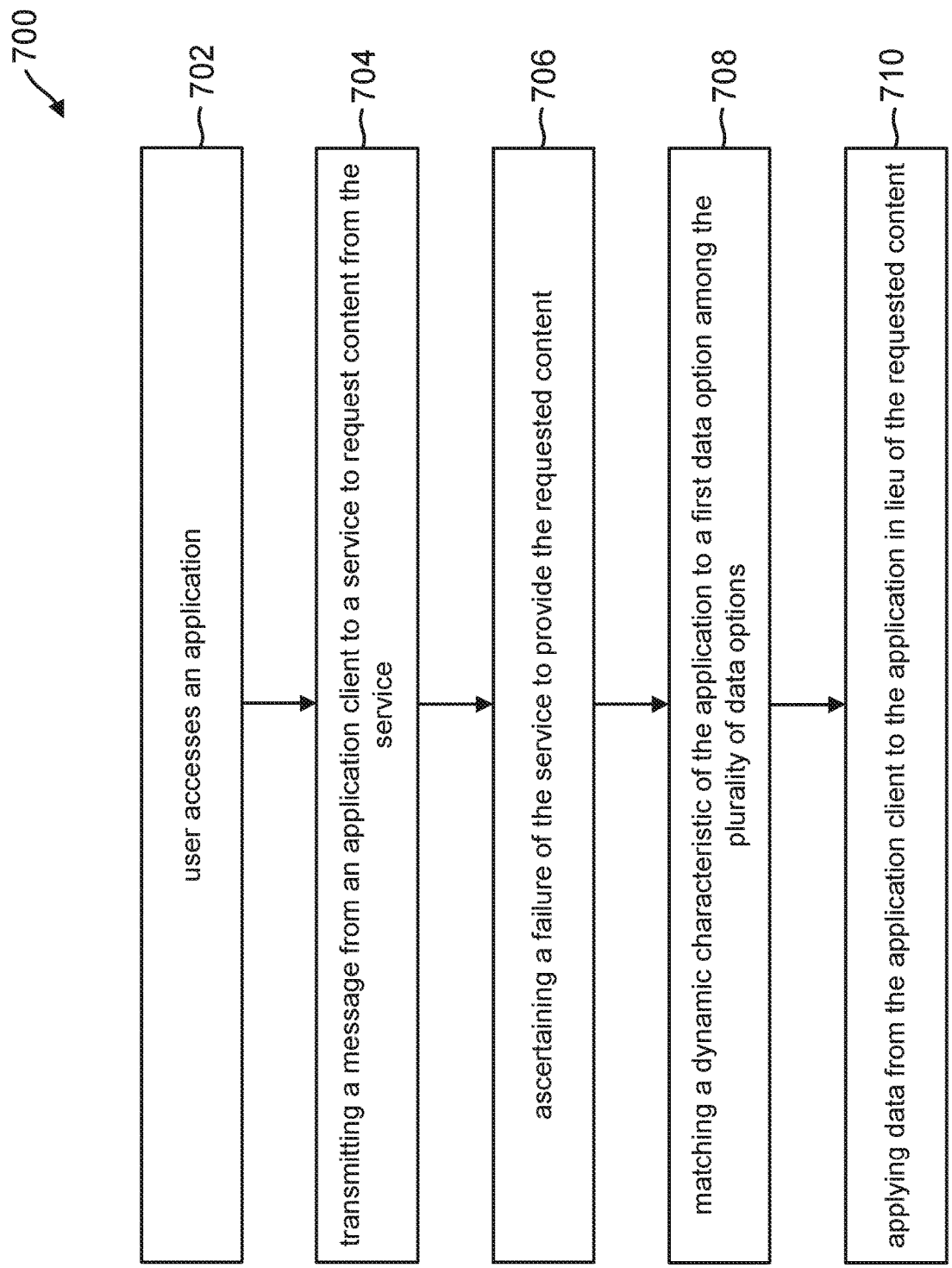
FIG. 7 is an illustration of an example process for applying content to an application, according to one embodiment.

FIG. 7 is an illustration of example method 700 for providing application content, according to one embodiment. Method 700 may be performed by an application server and, specifically, by processors of the application server 140 as they execute computer code to provide functionality described herein.

At action 702, the user accesses an application. From the point of view of an application server, that may include receiving a request from a user device directed to a specific application. For instance, in an example wherein the application includes a specific webpage, action 702 may include receiving an HTTP request for the specific webpage at the application server.

At action 704, the application server transmits a message, on behalf of an application client, to a service. The message request content from the service. An example is shown in FIG. 6 at actions 602 and 608. In the specific example of FIG. 7, it is the application client, which transmits the message to the service to request the content.

At action 706, the application client ascertains a failure of the service to provide the requested content. For instance, the application client may transmit the message to the service and then timeout before an answer is received. Similarly, action 706 may include the application client receiving an error message from the service or receiving unexpected content. In various embodiments, the application client may include logic to ascertain a failure from any set of circumstances that results in not receiving the requested content from the service. An example is shown at actions 604 and 606 of FIG. 6.

At action 708, the application client matches a dynamic characteristic of the application to a first data option among the plurality of data options. For instance, the application client may recognize that the language of the particular application is Spanish, and in response to recognizing Spanish, the application client selects some of its own stored content corresponding to the Spanish characteristic. However, the scope of embodiments is not limited to language as the only dynamic characteristic that may be accommodated. In other embodiments, dynamic characteristics may include a location of the user, including legal requirements local to the user.

At action 710, the application client applies data to the application in lieu of the requested content. As noted above, the application client may select particular content corresponding to a dynamic characteristic at action 708, and the application client may then apply that data to the application at action 710. In one example, action 710 includes the application client transmitting the data corresponding to the content over a network and to a user device. An example is described above at action 606 of FIG. 6.

The scope of embodiments is not limited to the particular series of actions depicted in FIG. 7. Rather, various embodiments may add, omit, rearrange, or modify the actions. For instance, the user may access a multitude of different applications during a particular transaction. Thus, at actions 702-710, there is a failure of the service to provide the requested content and the application client provides its content instead. However, the service may regain functionality during the user's visit. In such case, subsequent to applying the data from the application client, the application client or another application client may successfully receive the requested content in response to the application being accessed. In this example, the data applied from the application client to the application comprises a first set of webpage features, and the first set of webpage features includes a fewer number of webpage features then would have been provided by the service.

Figure 8:
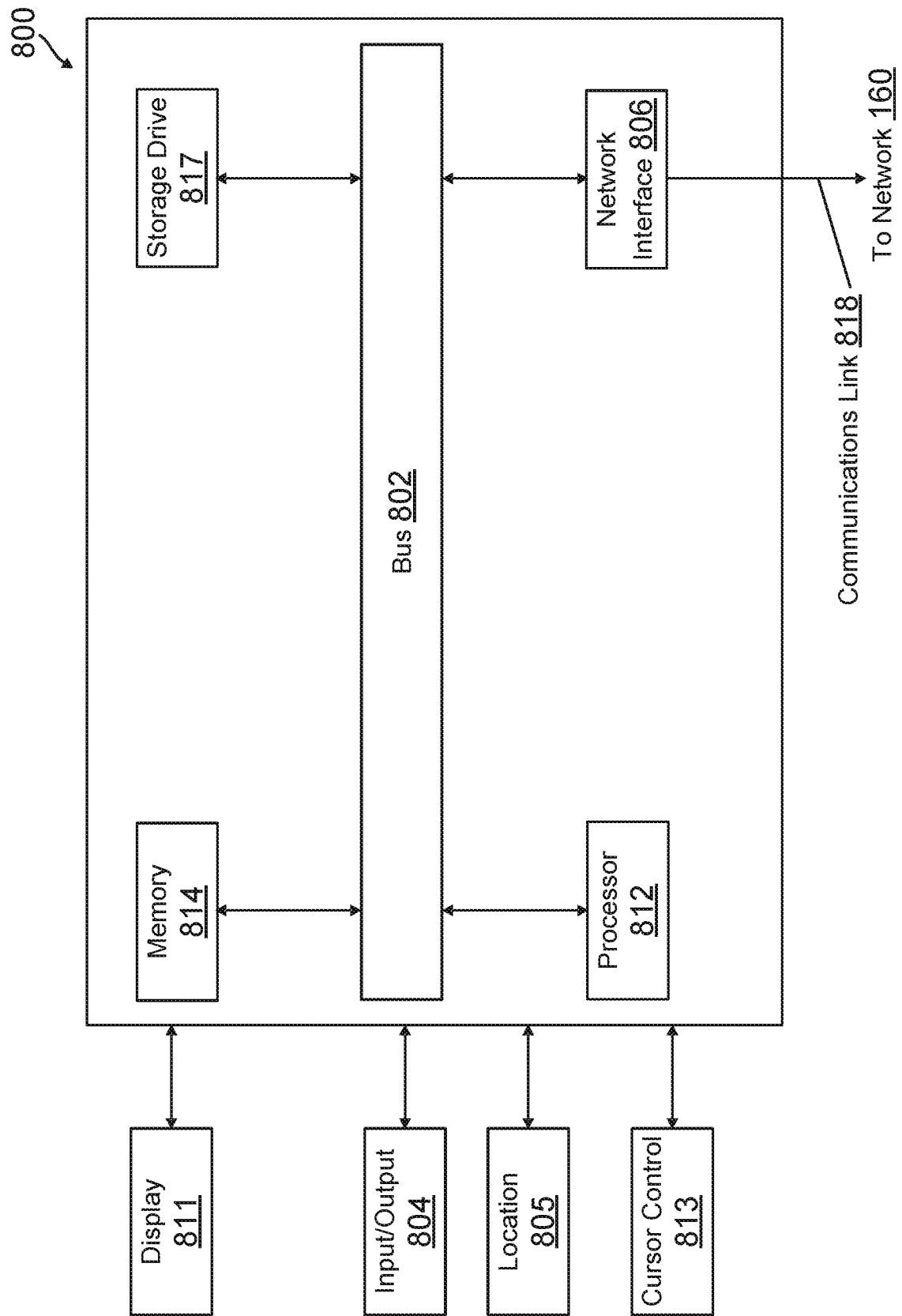
FIG. 8 is a block diagram of a computer system suitable for implementing one or more components in FIG. 1 according to one embodiment.

FIG. 8, an embodiment of a computer system 800 suitable for implementing, for example, the computing devices 110, 140, and 150 of FIG. 1 discussed above. It should be appreciated that other devices utilized in the system discussed above may be implemented as the computer system 800 in a manner as follows.

In accordance with various embodiments of the present disclosure, computer system 800, such as a smart phone, computer, and/or a network server, includes a bus 802 or other communication mechanism for communicating information, which interconnects subsystems and components, such as a processing component 812 (e.g., processor, microcontroller, digital signal processor (DSP), etc.), a system memory component 814 (e.g., RAM) a storage drive component 817 (e.g., solid-state, hard drive, or optical), a network interface component 806 (e.g., wireless card, modem, or Ethernet card), a display component 811 (e.g., a touchscreen, CRT, or LCD), an input/output component 804 (e.g., keyboard, keypad, a touchscreen), a cursor control component 813 (e.g., mouse, pointer, or trackball), and/or a location determination component 805 (e.g., a Global Positioning System (GPS) device as illustrated, a cell tower triangulation device, and/or a variety of other location determination devices known in the art). In one implementation, the storage drive component 817 may comprise a database having one or more storage drive components.

In accordance with embodiments of the present disclosure, the computer system 800 performs specific operations by the processor 812 executing one or more sequences of instructions contained in the memory component 814, such as described herein with respect to FIGS. 1-7 discussed above. Such instructions may be read into the system memory component 814 from another computer readable medium, such as storage drive 817. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 812 for execution. Such a medium may take many forms, including but not limited to, non-volatile media and volatile media. In various implementations, non-volatile media includes hard drive or solid state drives, such as the storage drive component 817, and volatile media includes dynamic memory, such as the system memory component 814. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of the computer systems 800 coupled by a communication link 818 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 818 and the network interface component 806. The network interface component 806 may include an antenna, either separate or integrated, to enable transmission and reception via the communication link 818. Received program code may be executed by processor 812 as received and/or stored in storage drive component 817 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving, from a user device, a first request for content associated with a user interface presentation;
generating first data for a first portion of the content;
transmitting, from an application client to a service provider server, a second request for a second portion of the content based on the first request, wherein the second portion corresponds to a header or a footer of the user interface presentation;
ascertaining a failure of the service provider server to provide the second portion of the content;
in response to ascertaining the failure, applying second data from the application client to the user interface presentation in lieu of the second portion of the content, wherein the second data from the application client is determined by omitting one or more parts of the second portion of the content;
generating content data based on the first data and the second data; and
transmitting the content data to the user device as a response to the first request.

2. The system of claim 1, wherein the second portion of the content includes a plurality of interactive webpage elements, and wherein the user interface presentation comprises an interactive webpage configured to incorporate the plurality of webpage elements.

3. The system of claim 2, wherein the second data excludes at least one interactive webpage element from the plurality of interactive webpage elements.

4. The system of claim 1, wherein the operations further comprise:
receiving, from the service provider server, an error message, wherein the failure is ascertained based on the error message.

5. The system of claim 1, wherein the operations further comprise:
determining a lack of response from the service provider server after a predetermined duration has passed from the transmitting the second request, wherein the failure is ascertained based on the lack of response from the service provider server.

6. The system of claim 1, wherein the operations further comprise:
determining a first dynamic characteristic of the user device; and
in response to ascertaining the failure, selecting, from a plurality of data options, a first data option that matches the first dynamic characteristic of the user device, wherein the second data is determined based on the first data option.

7. The system of claim 6, wherein the plurality of data options correspond to a plurality of language options for displaying the user interface presentation.

8. The system of claim 1, wherein the second request is transmitted by the application client to the service provider server over a network.

9. The system of claim 1, wherein the second portion of the content comprises a first plurality of interactive webpage features, and wherein the second data comprises a second plurality of interactive webpage features that is fewer than the first plurality of interactive webpage features.

10. A method comprising:
receiving, by one or more hardware processors from a user device, a request to access an application over a network;

generating, by the one or more hardware processors, first data for a first portion of the application;

transmitting, from an application client to a service server, a second request for a second portion of the application, wherein the second portion corresponds to a header or a footer of a user interface presentation of the application;

detecting a failure of the service server to provide the second portion of the application;

in response to detecting the failure, applying, by the one or more hardware processors, second data from the application client to the application in place of the second portion of the application, wherein the second data from the application client is determined by omitting one or more parts of the second portion of the application;

compiling, by the one or more hardware processors, the application based on the first data and the second data; and transmitting the application to the user device as a response to the first request.

11. The method of claim 10, wherein the second portion includes a plurality of interactive webpage elements, and wherein the application comprises an interactive webpage configured to incorporate the plurality of interactive webpage elements.

12. The method of claim 10, wherein the application comprises an interactive webpage configured to incorporate the header or the footer.

13. The method of claim 10, further comprising:
receiving, from the service server, an error message after transmitting the second request to the service server, wherein the failure is detected based on the error message.

14. The method of claim 10, further comprising:
determining a first dynamic characteristic of the user device; and
in response to detecting the failure, selecting, from a plurality of data options, a first data option that matches the first dynamic characteristic of the user device, wherein the second data is applied to the application based on the first data option.

15. The method of claim 14, wherein the plurality of data options corresponds to a plurality of language options for presenting the application.

16. A non-transitory machine-readable medium having stored thereon machine-readable instructions executable to cause a machine to perform operations comprising:
receiving a user request for a web application;
generating first data for a first portion of the web application;
transmitting, by an application client to a service server, a second request for a second portion of the web application based on the first request, wherein the second portion corresponds to a header or a footer of a webpage of the web application;
in response to a failure of the service server to provide the second portion of the web application, determining second data for the web application in lieu of the second portion of the web application, wherein the second data is determined by omitting one or more parts of the second portion of the web application;
generating the web application based on the first data and the second data; and
transmitting the web application to the user device as a response to the first request.

17. The non-transitory machine-readable medium of claim 16, wherein the web application comprises an interactive webpage configured to incorporate the header or the footer.

18. The non-transitory machine-readable medium of claim 16, wherein the operations further comprise:
ascertaining the failure of the service server based on a lack of response from the service server after a predetermined duration has passed from the transmitting the second request.

19. The non-transitory machine-readable medium of claim 16, wherein the operations further comprise:
determining a first dynamic characteristic associated with the user device; and
in response to the failure, selecting, from a plurality of data options, a first data option that matches the first dynamic characteristic, wherein the second data is determined based on the first data option.

20. The non-transitory machine-readable medium of claim 19, wherein the plurality of data options correspond to a plurality of language options for presenting the web application.

* * * * *